US012651715B2

(12) United States Patent (10) Patent No.: US 12,651,715 B2

Ohara (45) Date of Patent: Jun. 9, 2026

(54) ROTATION DETECTION DEVICE AND STYLUS PEN

(71) Applicant: ALPS ALPINE CO., LTD., Tokyo (JP)

(72) Inventor: Hiroshi Ohara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 283 days.

(21) Appl. No.: 18/441,434

(22) Filed: Feb. 14, 2024

(65) Prior Publication Data

US 2024/0186081 A1 Jun. 6, 2024

Related U.S. Application Data

(63) Continuation of application No. PCT/JP2022/011414, filed on Mar. 14, 2022.

(30) Foreign Application Priority Data

Sep. 24, 2021 (JP) .................................. 2021-156047

(51) Int. Cl.
H01H 19/14 (2006.01)
G05G 1/10 (2006.01)
(Continued)

(52) U.S. Cl.
CPC .............. H01H 19/14 (2013.01); G05G 1/10 (2013.01); G05G 5/03 (2013.01); G05G 5/05 (2013.01);
(Continued)

(58) Field of Classification Search
CPC .... H01H 19/14; H01H 19/04; H01H 2215/00; H01H 19/02; H01H 3/08; H01H 19/001;
(Continued)

(56) References Cited

U.S. PATENT DOCUMENTS

2010/0329500 A1* 12/2010 Li ........................ H04R 1/1041
381/384
2018/0224954 A1* 8/2018 Chiang ................. G06F 3/0362
2018/0284891 A1 10/2018 Eck et al.

FOREIGN PATENT DOCUMENTS

JP H09-274830 10/1997
JP 2003-108301 4/2003
(Continued)

OTHER PUBLICATIONS

International Search Report for PCT/JP2022/011414 mailed on May 24, 2022.

*Primary Examiner* — Lheiren Mae A Caroc
(74) *Attorney, Agent, or Firm* — IPUSA, PLLC

(57) ABSTRACT

A rotation detection device includes an operation member having an annular shape and configured to be rotatable about a rotation center axis; a base member disposed within the operation member; a switch configured to be pressed as the operation member rotates and disposed on the base member such that a rotation direction of the operation member coincides with a pressing direction; and a returning mechanism configured to return the operation member to an initial position by an elastic force. The returning mechanism is provided within the operation member, and is located opposite to the switch with the rotation center axis interposed between the returning mechanism and the switch.

10 Claims, 20 Drawing Sheets

(51) Int. Cl.

| | |
|---|---|
| *G05G 5/03* | (2008.04) |
| *G05G 5/05* | (2006.01) |
| *G06F 3/0354* | (2013.01) |
| *H01H 19/04* | (2006.01) |

(52) U.S. Cl.
CPC ......... *G06F 3/03545* (2013.01); *H01H 19/04* (2013.01); *G05G 2505/00* (2013.01); *H01H 2215/00* (2013.01)

(58) Field of Classification Search
CPC .... H01H 19/08; H01H 19/36; H01H 2221/01; H01H 2221/036; H01H 2221/044; G05G 1/10; G05G 5/03; G05G 5/05; G05G 2505/00; G05G 1/015; G06F 3/03545; G06F 3/03; G06F 3/0362; G06F 3/0354
See application file for complete search history.

(56) References Cited

FOREIGN PATENT DOCUMENTS

| | | |
|---|---|---|
| JP | 2018-532196 | 11/2018 |
| WO | 2019/209213 | 10/2019 |

* cited by examiner

100

AX

143

140

142    142

144
144A

141

115  113B  114  113A  115

111
110

151B    151A
151
150

160

130B    130C  130

131A    131B

130A 125    123    125

121A    121B    120

121Aa    122  121Ba 100-2

X
Z Y

ROTATION DETECTION DEVICE AND STYLUS PEN

CROSS-REFERENCE TO RELATED APPLICATIONS

This application is a continuation of International Application No. PCT/JP2022/011414, filed on Mar. 14, 2022 and designating the U.S., which claims priority to Japanese Patent Application No. 2021-156047, filed on Sep. 24, 2021. The contents of these applications are incorporated herein by reference in their entireties.

BACKGROUND OF THE INVENTION

1. Field of the Invention

The present disclosure relates to a rotation detection device and a stylus pen.

2. Description of the Related Art

Japanese Laid-open Patent Publication No. 9-274830 relates to a composite-operation-type electrical component including an operation body on which a rotation operation can be performed, and describes a technology by which a torsion coil spring applies a returning force to the operation body that returns the operation body to the center position.

However, in the technology described in Japanese Laid-open Patent Publication No. 9-274830, the torsion coil spring is used. Therefore, it is difficult to reduce the size of the operation body in the radial direction with respect to the rotation center, and, for example, it is difficult to attach the composite-operation-type electrical component to a member having a small width, such as a stylus pen, without any discomfort.

SUMMARY OF THE INVENTION

A rotation detection device according to one embodiment includes an operation member having an annular shape and configured to be rotatable about a rotation center axis; a base member disposed within the operation member; a switch configured to be pressed as the operation member rotates and disposed on the base member such that a rotation direction of the operation member coincides with a pressing direction; and a returning mechanism configured to return the operation member to an initial position by an elastic force. The returning mechanism is provided within the operation member, and is located opposite to the switch with the rotation center axis interposed between the returning mechanism and the switch.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

In the following, embodiments will be described with reference to the accompanying drawings. In the following description, for convenience, a direction parallel to a rotation center axis AX is referred to as a Z-axis direction. A side on which an upper cover 140 is provided is referred to as an upper side (a positive Z-axis side). A side on which a base member 120 is provided is referred to as a lower side (negative Z-axis direction).

(Overview of Rotation Detection Device 100)

Figure 1:
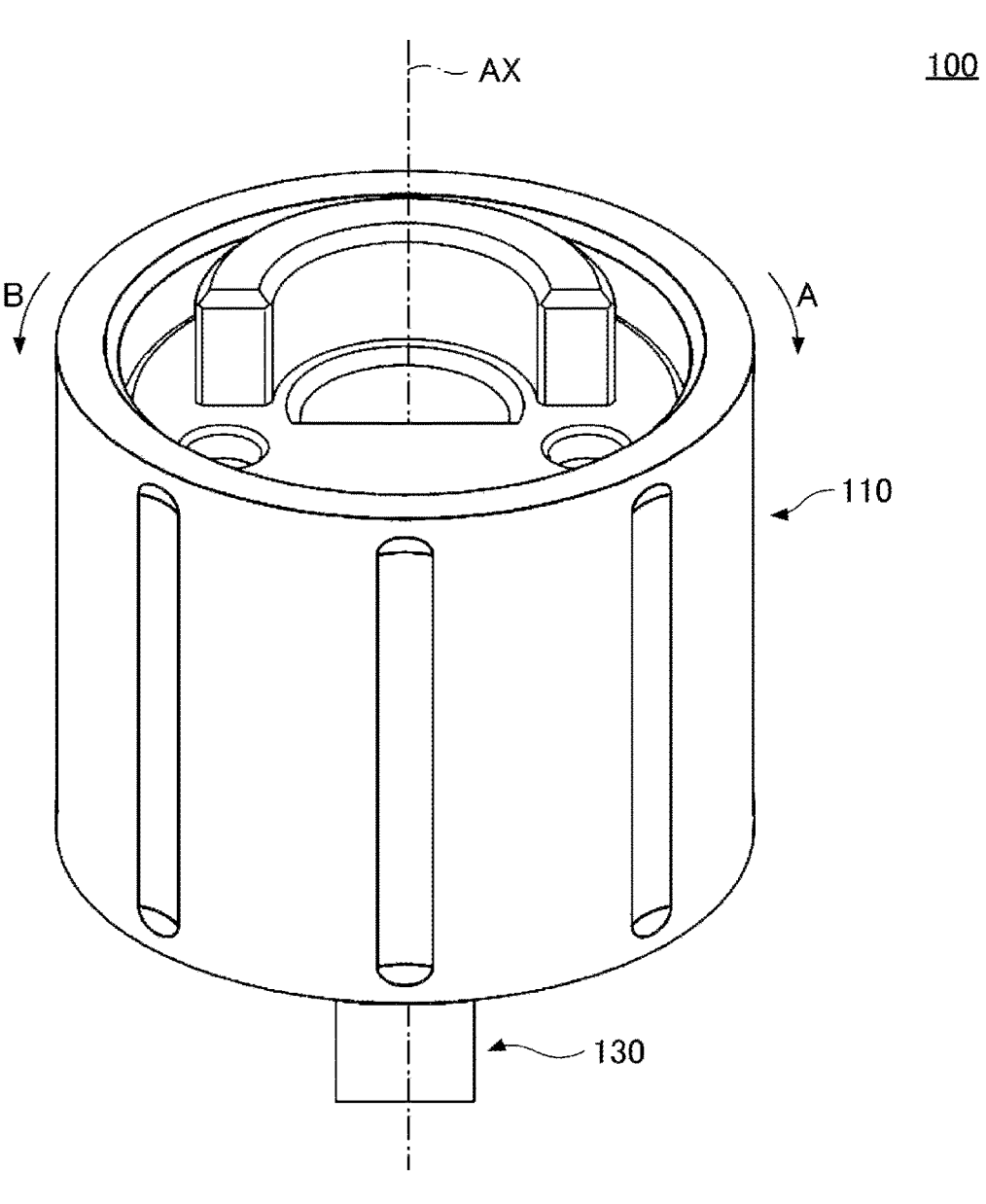
FIG. 1 is a perspective view of the exterior of a rotation detection device according to an embodiment.

FIG. 1 is a perspective view of the exterior of a rotation detection device 100 according to an embodiment. The rotation detection device 100 illustrated in FIG. 1 includes an operation member 110 having an annular shape and configured to be rotatable about the rotation center axis AX. The rotation detection device 100 is a device that is mainly attached to a cylindrical-shaped stylus pen, and, in response to a rotation operation being performed on the operation member 110, is configured to detect the rotation operation and output a switch signal for switching the function of the stylus pen via a flexible printed circuit (FPC) 130 that extends downward (in the negative Z-axis direction) relative to the operation member 110.

(Configuration of Rotation Detection Device 100)

Figure 2:
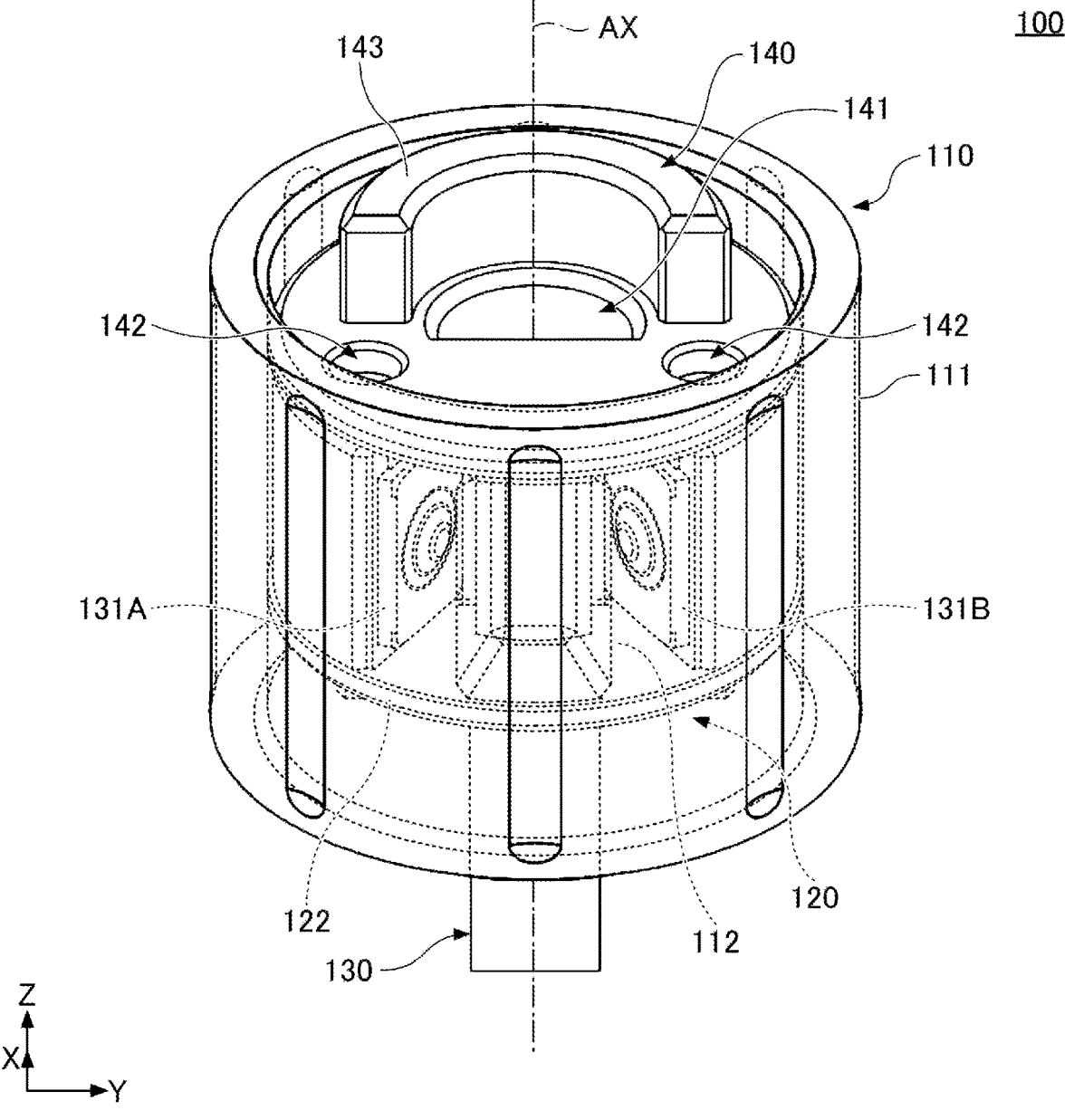
FIG. 2 is a perspective view of the rotation detection device according to the embodiment.
Figure 3:
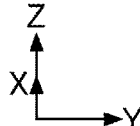
FIG. 3 is an exploded perspective view of the rotation detection device according to the embodiment.
Figure 4:
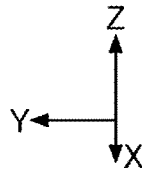
FIG. 4 is an exploded perspective view the rotation detection device according to the embodiment.

FIG. 2 is a perspective view of the rotation detection device 100 according to the embodiment. FIG. 3 and FIG. 4 are exploded perspective views of the rotation detection device 100 according to the embodiment. As illustrated in FIG. 2 through FIG. 4, the rotation detection device 100 includes the operation member 110, the base member 120, the FPC 130, the upper cover 140, a cam member 150, and a coil spring 160.

The operation member 110 is an annular-shaped member that is made of a resin and is rotatable in both directions (a clockwise direction (indicated by an arrow A) and a counterclockwise direction (indicated by an arrow B)) about the rotation center axis AX.

The operation member 110 includes a wall-shaped protrusion 112 within an annular-shaped main body 111. The protrusion 112 can press a pair of switches 131A and 131B. The protrusion 112 has a wall shape protruding from the inner circumferential surface of the annular-shaped main body 111 of the operation member 110 toward the center of the main body 111. The protrusion 112 is located between the pair of switches 131A and 131B that face each other. With this configuration, when the operation member 110 rotates clockwise, a pressing surface 112A, facing the switch 131A, of the protrusion 112 can press the switch 131A. Further, when the operation member 110 rotates counterclockwise, a pressing surface 112B, facing the switch 131B, of the protrusion 112 can press the switch 131B.

Further, the operation member 110 includes a pair of movable wall portions 115 within the annular-shaped main body 111. Each of the movable wall portions 115 protrudes from the inner circumferential surface of the main body 111, and has a horizontal flat plate shape. An opening 114 is provided between the pair of movable wall portions 115. The movable wall portions 115 have cam surfaces 113A and 113B at the respective ends on the opening 114 side. The cam surfaces 113A and 113B are downwardly inclined surfaces and can press a cam lobe 151 of the cam member 150. The pair of cam surfaces 113A and 113B face the cam lobe 151 (a pair of inclined surfaces 151A and 151B) of the cam member 150, and can return the operation member 110 to its initial position by being pressed by the cam lobe 151. The pair of movable wall portions 115 can also limit the maximum rotation angle of the operation member 110 to a predetermined angle (for example, 15°), by contacting the wall surfaces of pillar portions 121A and 121B of the base member 120 when the operation member 110 rotates. The pair of cam surfaces 113A and 113B is an example of a "contact portion". However, the "contact portion" is not limited to a cam surface (inclined surface), as long as the "contact portion" can return the operation member 110 to its initial position upon at least the cam lobe 151 contacting the "contact portion". For example, the "contact portion" may be a lower portion or the like having a horizontal flat plate shape and provided so as to protrude from the inner circumferential surface of the main body 111 toward the cam lobe 151.

The base member 120 is a member made of a resin and disposed within the operation member 110. The base member 120 includes a disc-shaped bottom plate portion 122 at the bottom thereof. Further, the base member 120 includes pillar portions 121A, 121B, 121C, 121D, and 123 that protrude upward from the upper surface of the bottom plate portion 122. The pillar portions 121A and 121B are provided mainly for supporting the pair of switches 131A and 131B between the pillar portions 121A and 121B in a state in which the switches 131A and 131B face each other. The pillar portions 121C and 121D are provided mainly for holding the cam member 150 between the pillar portions 121C and 121D, such that the cam member 150 is slidable in the up-down direction (Z-axis direction). The pillar portion 123 is provided between the pillar portion 121A and the pillar portion 121B. The pillar portion 123 is provided mainly for supporting a base portion 130A of the FPC 130. A through-hole 124 penetrating the bottom plate portion 122 of the base member 120 in the up-down direction is formed in the center of the base member 120. Further, through-holes 125 penetrating the pillar portions 121A and 121B in the up-down direction are formed in the base member 120. Fixing screws are inserted into the respective through-holes 125 in order to fix the rotation detection device 100 to the stylus pen or the like. Further, a semi-cylindrical protrusion 126 for positioning the rotation detection device 100 with respect to the stylus pen or the like is provided on the lower surface of the bottom plate portion 122 of the base member 120 so as to protrude downward.

The FPC 130 is a film-shaped circuit substrate having flexibility. The FPC 130 includes the base portion 130A and a pair of mounting portions 130B and 130C. The base portion 130A is a portion having a constant width and extending linearly in the up-down direction (Z-axis direction). The base portion 130A is disposed along a wall surface 123A, on the rotation center axis AX side, of the pillar portion 123 of the base member 120, and penetrates the through-hole 124 of the base member 120. Further, when the upper cover 140 is attached, the base portion 130A is stably held by being sandwiched between the wall surface 123A and a tongue portion 144A of the upper cover 140. The mounting portion 130B is a rectangular portion extending outward from one side of an upper end portion of the base portion 130A. The switch 131A is mounted on the mounting portion 130B. The mounting portion 130C is a rectangular portion extending outward from the other side of the upper end portion of the base portion 130A. The switch 131B is mounted on the mounting portion 130C.

The pair of switches 131A and 131B that can detect rotation of the operation member 110 in both directions about the rotation center axis AX are mounted on the FPC 130. Each of the switches 131A and 131B mounted on the FPC 130 is configured to be pressed as the operation member 110 rotates, and is disposed on the base member 120 such that a rotation direction of the operation member 110 coincides with a pressing direction. Specifically, the switches 131A and 131B are disposed on the base member 120 and face each other. The protrusion 112 of the operation member 110 is disposed between the switches 131A and 131B. Accordingly, the rotation detection device 100 according to the embodiment can cause the protrusion 112 of the operation member 110 to press a corresponding one of the switches 131A and 131B as the operation member 110 rotates in one of the directions. Specifically, when the operation member 110 rotates clockwise as viewed from above, the switch 131A is pressed by the protrusion 112, and as a result, the rotation detection device 100 according to the embodiment can detect clockwise rotation of the operation member 110. Conversely, when the operation member 110 rotates counterclockwise as viewed from above, the switch 131B is pressed by the protrusion 112, and as a result, the rotation detection device 100 according to the embodiment can detect counterclockwise rotation of the operation member 110. Each of the switches 131A and 131B can provide a clicking sensation.

The upper cover 140 is a disc-shaped member made of a resin and disposed within the operation member 110 so as to overlap the upper side of the base member 120. The pair of movable wall portions 115 are sandwiched between the upper cover 140 and the base member 120 within the operation member 110, thereby allowing the operation member 110 to be rotatably supported by the base member 120. A through-hole 141 penetrating the upper cover 140 in the up-down direction is formed in the center of the upper cover 140. Further, a pair of through-holes 142 penetrating the upper cover 140 in the up-down direction are formed in the upper cover 140. Fixing screws are inserted into the respective through-holes 142 so as to fix the rotation detection device 100 to the stylus pen or the like. Further, a semi-cylindrical protrusion 143 for positioning the rotation detection device 100 with respect to the stylus pen or the like is provided on the upper surface of the upper cover 140 so as to protrude upward. A semi-cylindrical portion 144 is provided on the lower surface of the upper cover 140 so as to protrude downward. The upper end of the inner space of the semi-cylindrical portion 144 is connected to the through-hole 141, and the lower end of the inner space of the semi-cylindrical portion 144 is connected to the through-hole 124 of the base member 120. The tongue portion 144A is provided on a flat surface portion of the semi-cylindrical portion 144 so as to extend further downward.

The cam member 150 is a member made of a resin, disposed within the operation member 110, and slidable in the up-down direction (Z-axis direction). The cam member 150 has the cam lobe 151 upwardly oriented (axially oriented along the rotation center axis AX). The cam lobe 151 has the pair of inclined surfaces 151A and 151B. The cam lobe 151 has a tapered shape whose width gradually decreases toward the upper side (the positive Z-axis side).

The coil spring 160 is an example of an "elastic member". The coil spring 160 is disposed under the cam member 150 within the operation member 110. The coil spring 160 preloads the cam member 150 upward (in the axial direction of the rotation center axis AX).

(Configuration in which Pair of Switches 131A and 131B are Pressed)

Figure 5:
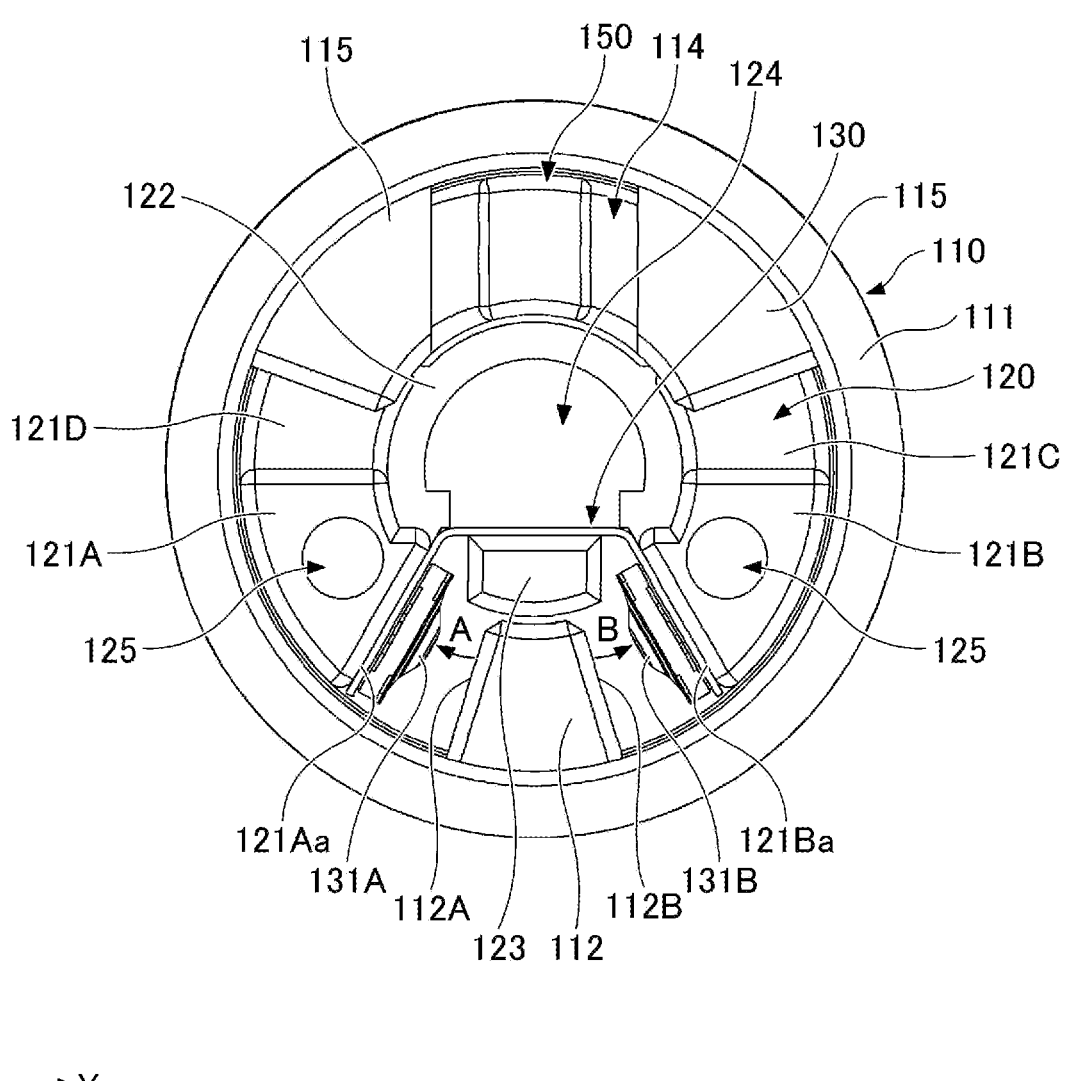
FIG. 5 is a plan view of the rotation detection device (from which an upper cover is removed) according to the embodiment, as viewed from above.
Figure 5:
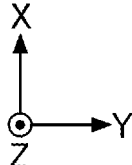
Figure 6:
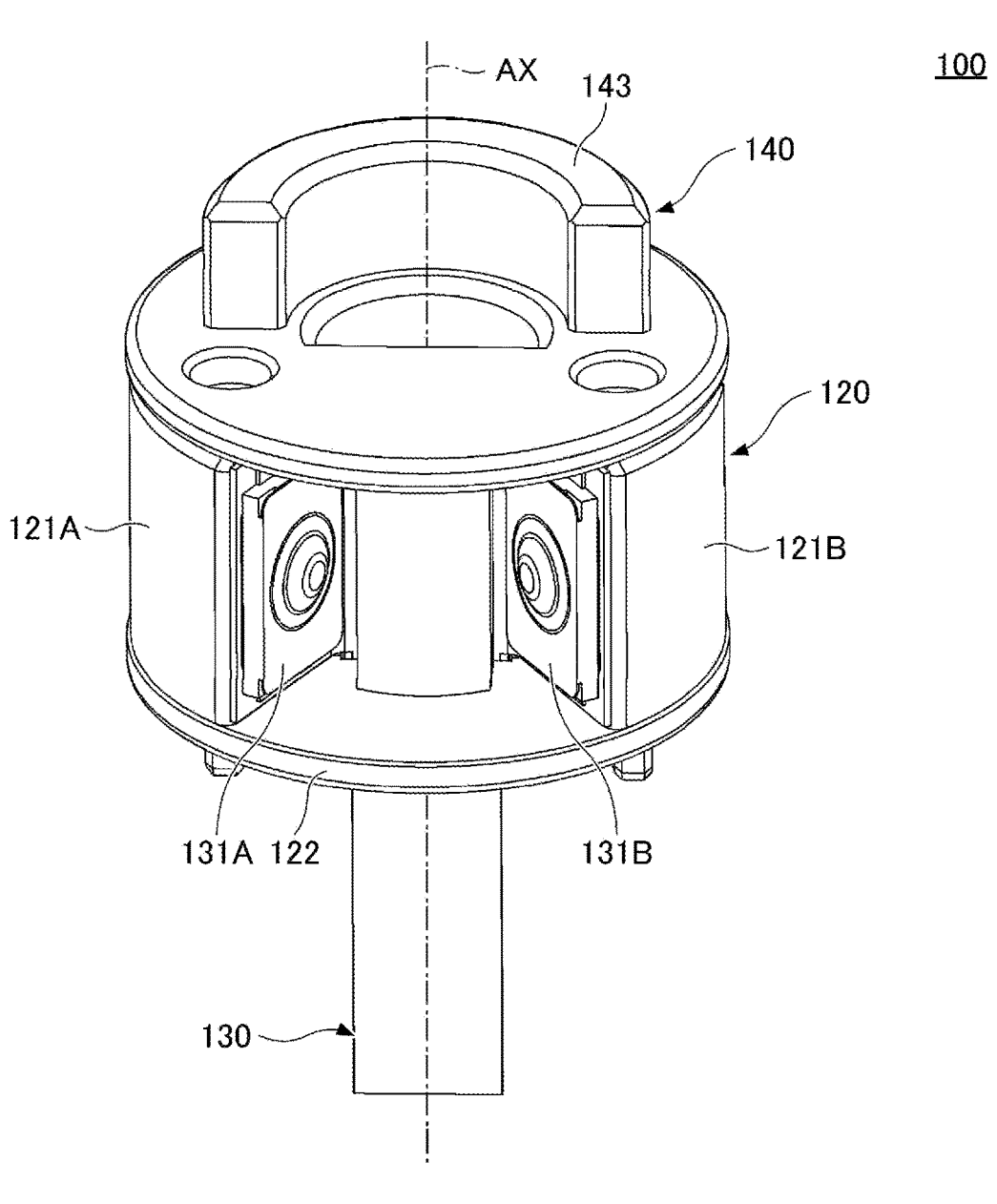
FIG. 6 is a perspective view of the exterior of the rotation detection device (from which an operation member is removed) according to the embodiment.
Figure 7:
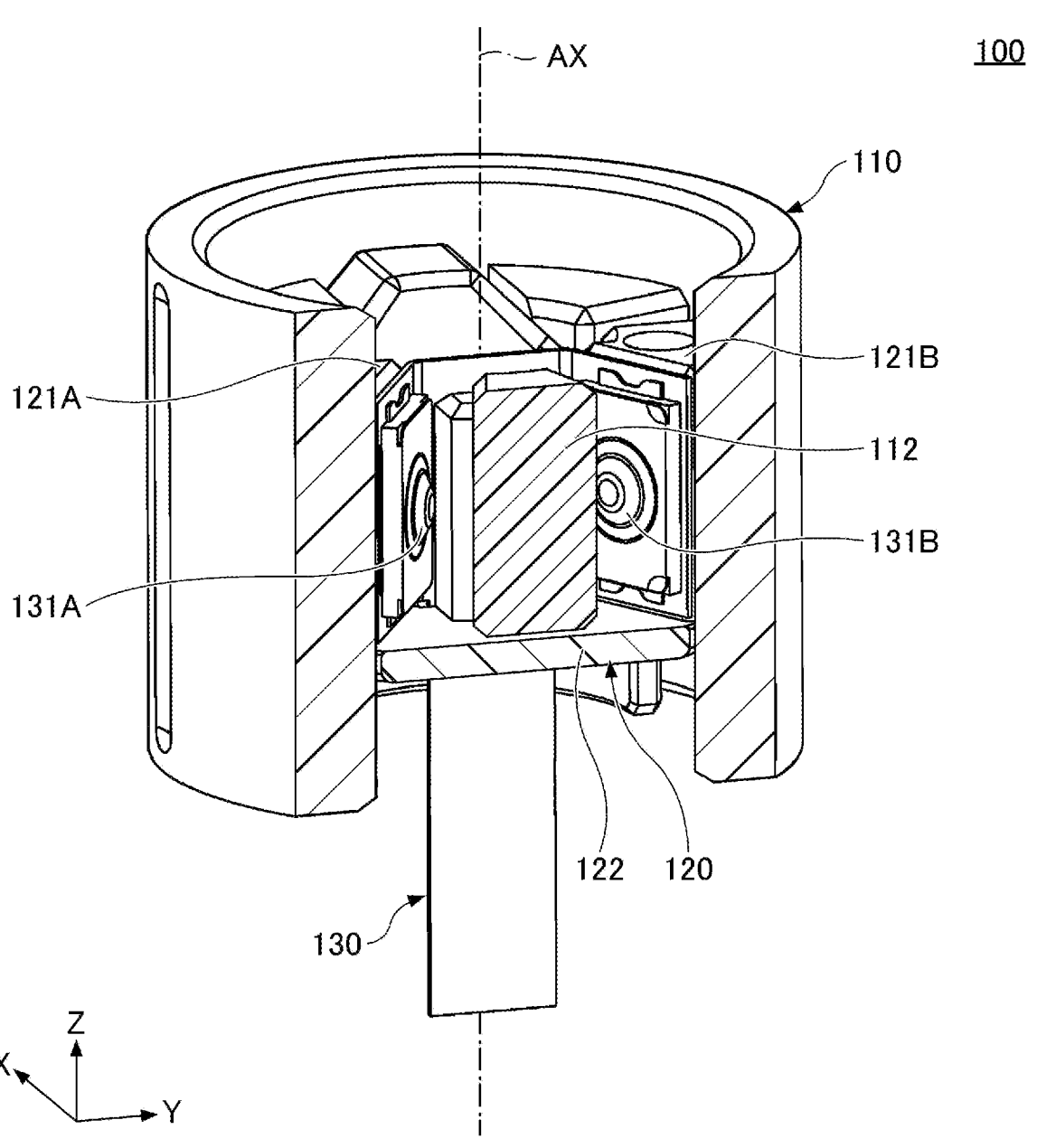
FIG. 7 is a cross-sectional view of the rotation detection device according to the embodiment.

FIG. 5 is a plan view of the rotation detection device 100 (from which the upper cover 140 is removed) according to the embodiment, as viewed from above. FIG. 6 is a perspective view of the exterior of the rotation detection device 100 (from which the operation member 110 is removed) according to the embodiment. FIG. 7 is a cross-sectional view of the rotation detection device 100 according to the embodiment. FIG. 5 through FIG. 7 illustrate a configuration in which the pair of switches 131A and 131B of the rotation detection device 100 according to the embodiment are pressed.

As illustrated in FIG. 5 through FIG. 7, the pair of pillar portions 121A and 121B of the base member 120 are disposed within the operation member 110. A placement surface 121Aa of the pillar portion 121A and a placement surface 121Ba of the pillar portion 121B face each other at a predetermined angle θ (30 degrees (°) in the present embodiment).

Further, as illustrated in FIG. 5 through FIG. 7, the switch 131A mounted on the FPC 130 is disposed on the placement surface 121Aa. In addition, the switch 131B mounted on the FPC 130 is disposed on the placement surface 121Ba. Accordingly, the pair of switches 131A and 131B face each other, and each of the switches 131A and 131B is disposed on the base member 120 such that a rotation direction of the operation member 110 coincides with a pressing direction.

Further, as illustrated in FIG. 5 through FIG. 7, the protrusion 112 of the operation member 110 is disposed between the switches 131A and 131B. The protrusion 112 has the pressing surface 112A facing the switch 131A, and the pressing surface 112B facing the switch 131B.

(Operation of Pressing Pair of Switches 131A and 131B)

Figure 8A:
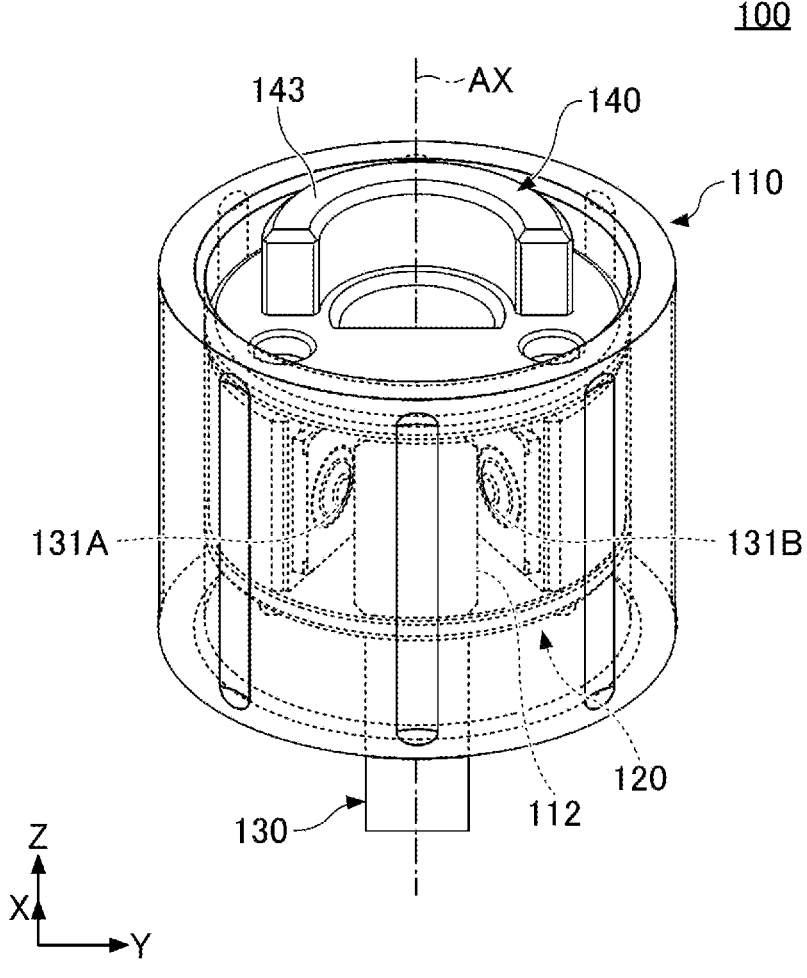
FIG. 8A is a perspective view illustrating the operation of pressing a pair of switches of the rotation detection device according to the embodiment.
Figure 8B:
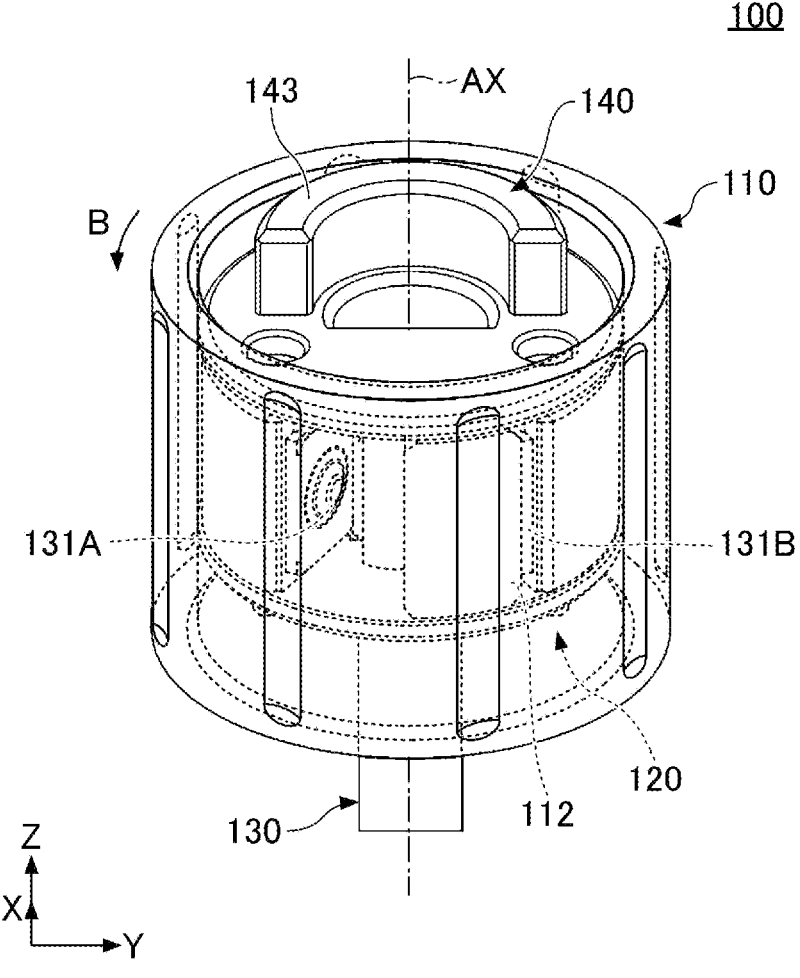
FIG. 8B is a perspective view illustrating the operation of pressing the pair of switches of the rotation detection device according to the embodiment.

FIG. 8A and FIG. 8B are perspective views illustrating the operation of pressing the pair of switches 131A and 131B of the rotation detection device 100 according to the embodiment.

As illustrated in FIG. 8A, in the rotation detection device 100 according to the embodiment, when no rotation operation is performed by an operator on the operation member 110, the protrusion 112 of the operation member 110 is in its initial position (intermediate position between the switches 131A and 131B).

As illustrated in FIG. 8B, in the rotation detection device 100 according to the embodiment, when the operation member 110 rotates in the counterclockwise direction (indicated by an arrow B illustrated in FIG. 8B), the switch 131B can be pressed by the protrusion 112 (the pressing surface 112B facing the switch 131B).

Conversely, in the rotation detection device 100 according to the embodiment, when the operation member 110 rotates in the clockwise direction, the switch 131A can be pressed by the protrusion 112 (the pressing surface 112A facing the switch 131A).

(Configuration of Returning Mechanism 100A)

Figure 9:
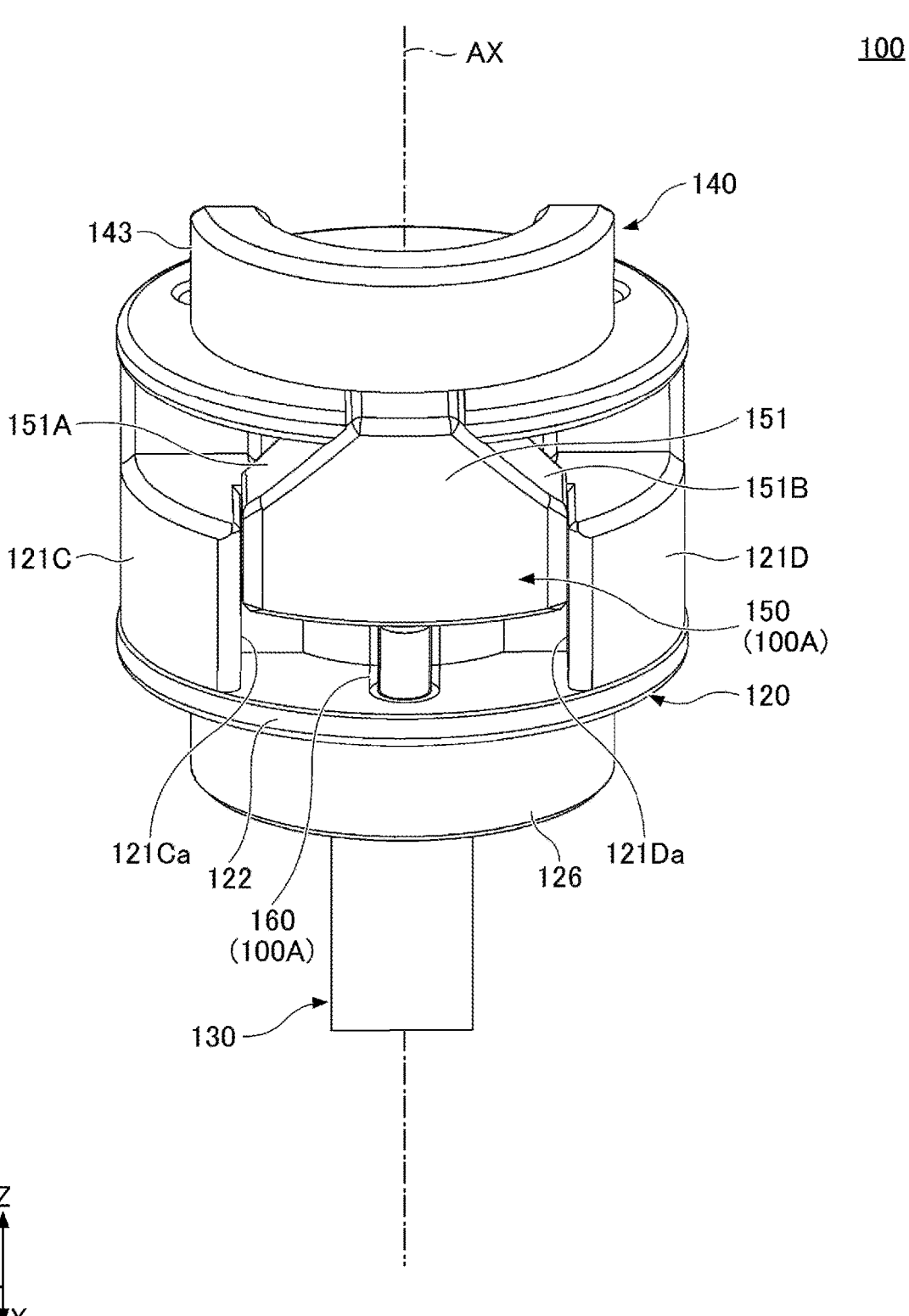
FIG. 9 is a perspective view of the exterior of the rotation detection device (from which the operation member is removed) according to the embodiment.
Figure 10:
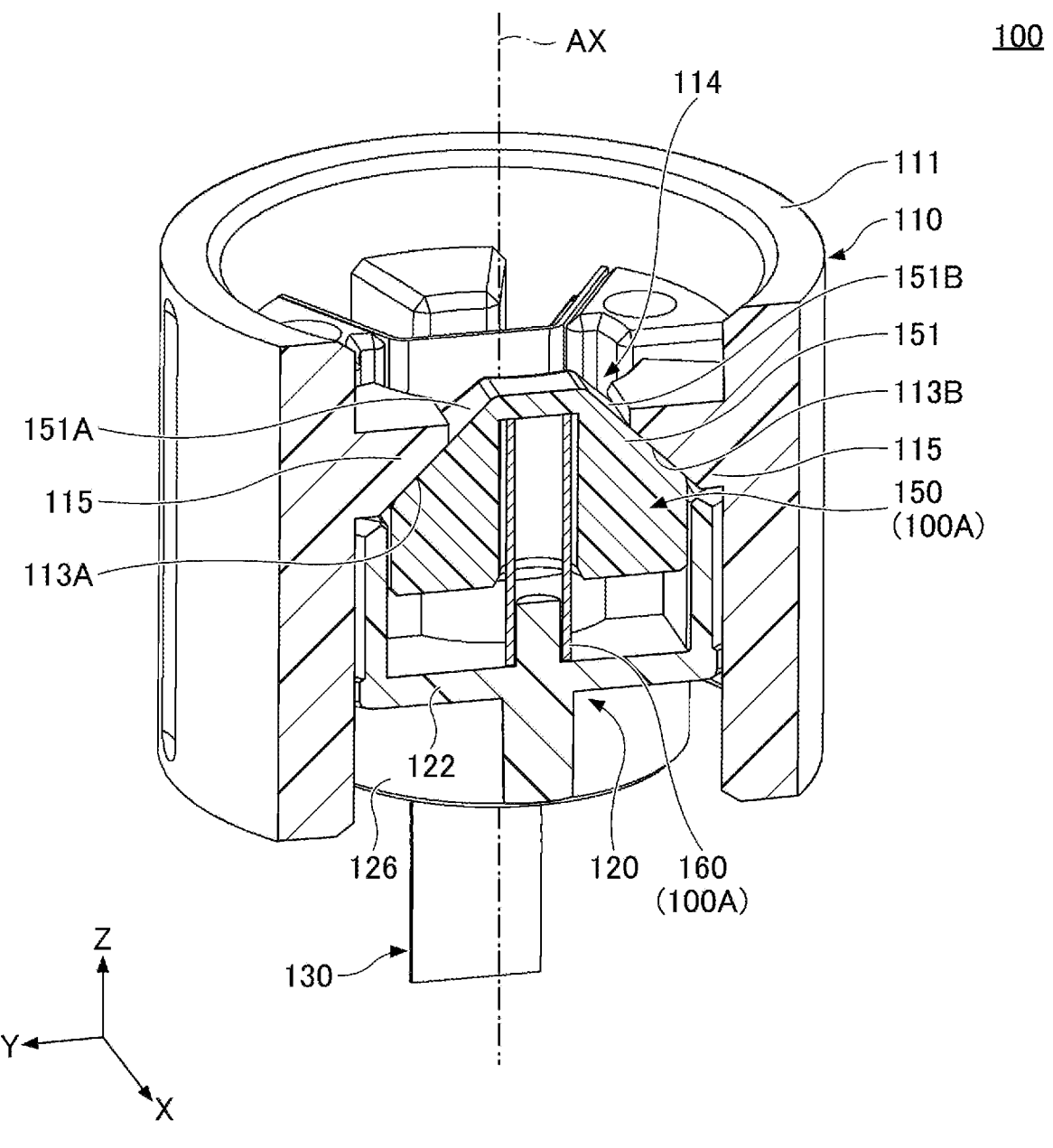
FIG. 10 is a cross-sectional view of the rotation detection device according to the embodiment.

FIG. 9 is a perspective view of the exterior of the rotation detection device 100 (from which the operation member 110 is removed) according to the embodiment. FIG. 10 is a cross-sectional view of the rotation detection device 100 according to the embodiment. FIG. 9 and FIG. 10 illustrate the configuration of a returning mechanism 100A included in the rotation detection device 100 according to the embodiment.

The rotation detection device 100 according to the embodiment includes the returning mechanism 100A configured to return the operation member 110 to its initial position by an elastic force. The returning mechanism 100A includes the cam member 150, the coil spring 160, and the pair of cam surfaces 113A and 113B of the operation member 110.

As illustrated in FIG. 9 and FIG. 10, the pair of pillar portions 121C and 121D of the base member 120 are disposed within the operation member 110. The cam member 150 is disposed between a sliding contact surface 121Ca of the pillar portion 121C and a sliding contact surface 121Da of the pillar portion 121D, and is slidable in the up-down direction (Z-axis direction). The cam member 150 has the cam lobe 151 on the upper end portion thereof. The cam lobe 151 has a tapered shape whose width gradually decreases toward the upper side (the positive Z-axis side). That is, the cam lobe 151 has the pair of inclined surfaces 151A and 151B.

As illustrated in FIG. 10, the operation member 110 has the pair of cam surfaces 113A and 113B within the annular-shaped main body 111. The cam surfaces 113A and 113B can press the pair of inclined surfaces 151A and 151B of the cam member 150. The pair of cam surfaces 113A and 113B are provided at the upper side of the cam member 150 so as to face the pair of inclined surfaces 151A and 151B of the cam lobe 151. As illustrated in FIG. 10, the cam surface 113A contacts the inclined surface 151A of the cam lobe 151, and has the same inclination angle as the inclined surface 151A of the cam member 150. The cam surface 113A can press the inclined surface 151A of the cam member 150 as the operation member 110 rotates counterclockwise. Further, the cam surface 113B contacts the inclined surface 151B of the cam lobe 151, and has the same inclination angle as the inclined surface 151B of the cam lobe 151. The cam surface 113B can press the inclined surface 151B of the cam member 150 as the operation member 110 rotates clockwise.

The coil spring 160 is provided on the lower side (negative Z-axis side) of the cam member 150, and preloads the cam member 150 upward (toward the positive Z-axis side). The pair of inclined surfaces 151A and 151B of the cam member 150 are pressed against the pair of cam surfaces 113A and 113B of the operation member 110 at all times by the preload force of the coil spring 160.

(Operation of Returning Mechanism 100A)

Figure 11A:
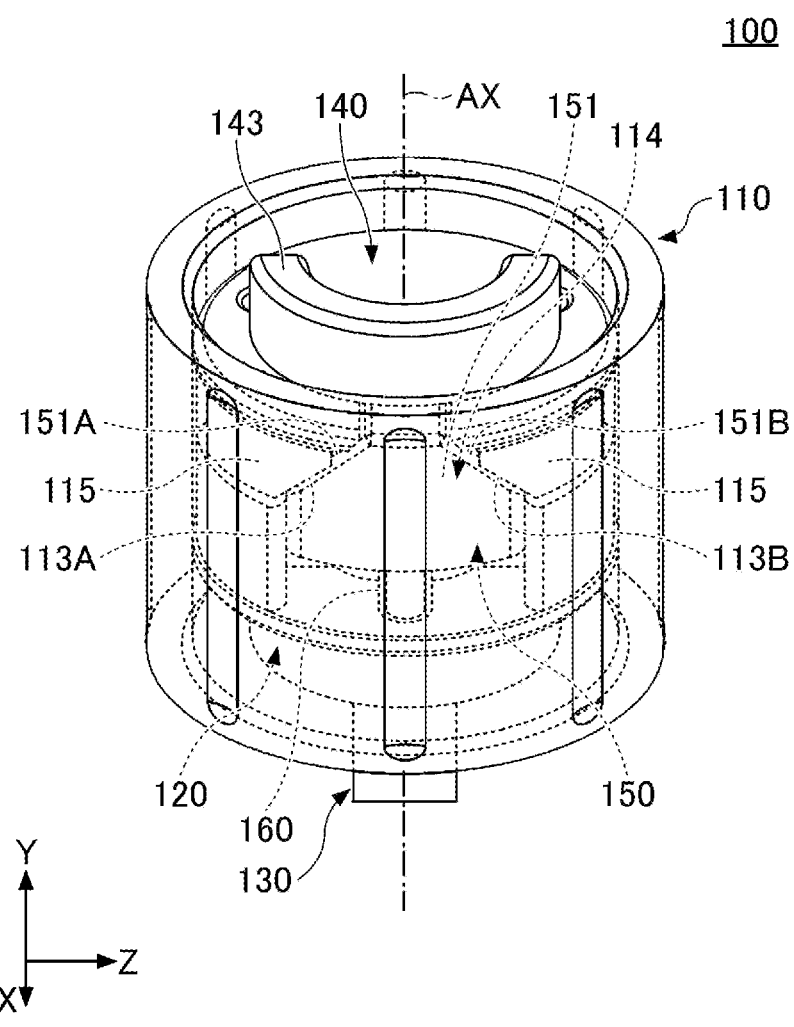
FIG. 11A is a perspective view illustrating the operation of a returning mechanism included in the rotation detection device according to the embodiment.
Figure 11B:
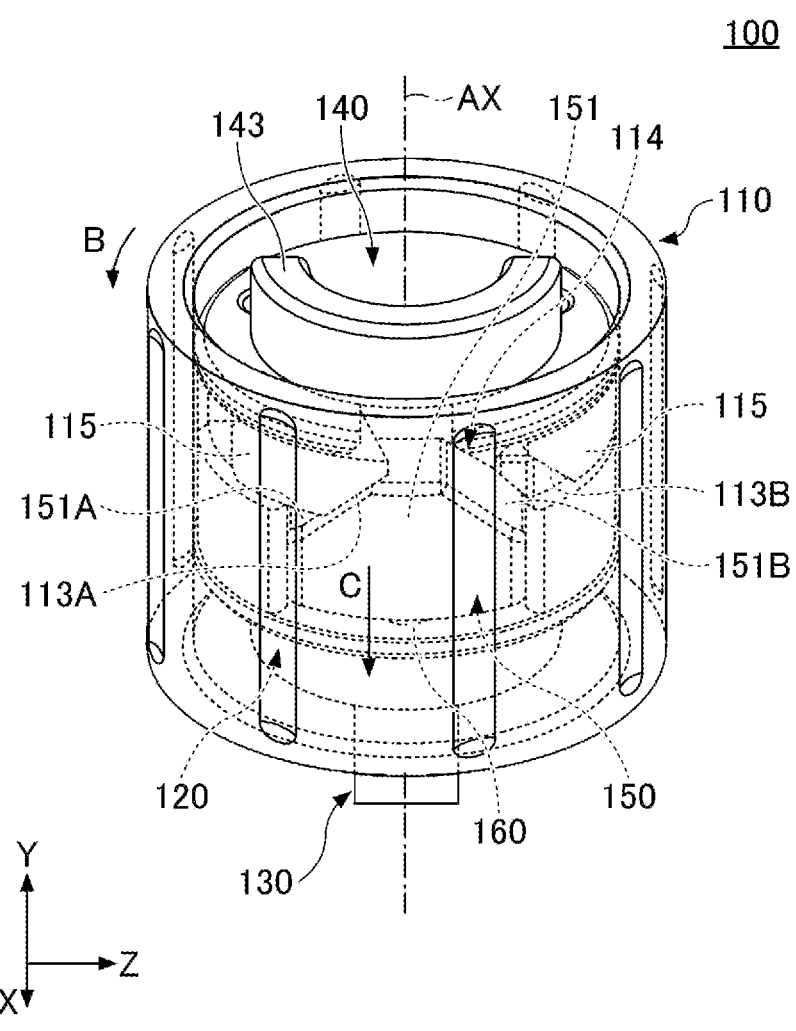
FIG. 11B is a perspective view illustrating the operation of the returning mechanism included in the rotation detection device according to the embodiment.

FIG. 11A and FIG. 11B are perspective views illustrating the operation of the returning mechanism 100A included in the rotation detection device 100 according to the embodiment.

As illustrated in FIG. 11A, when no rotation operation is performed by the operator on the operation member 110, the operation member 110 is in its initial position. At this time, the tip portion of the cam lobe 151 is fitted into the opening 114 between the cam surfaces 113A and 113B, and thus the operation member 110 is held in its initial position.

As illustrated in FIG. 11B, when a rotation operation is performed by the operator on the operation member 110 in the counterclockwise direction (indicated by an arrow B illustrated in FIG. 11B), the operation member 110 rotates counterclockwise about the rotation center axis AX, thereby causing the cam surface 113A of the operation member 110 to press the inclined surface 151A of the cam member 150. As a result, the cam member 150 is pressed down (in a direction indicated by an arrow C illustrated in FIG. 11B) while compressing the coil spring 160.

Conversely, when a rotation operation is performed by the operator on the operation member 110 in the clockwise direction, the operation member 110 rotates clockwise about the rotation center axis AX, thereby causing the cam surface 113B of the operation member 110 to press the inclined surface 151B of the cam member 150. As a result, the cam member 150 is pressed down (in the negative Z-axis direction) while compressing the coil spring 160.

Then, when the rotation operation on the operation member 110 is released by the operator, the cam member 150 is pressed up (toward the positive Z-axis side) by the elastic force of the coil spring 160. At this time, the inclined surface 151A or the inclined surface 151B of the cam member 150 presses the cam surface 113A or the cam surface 113B of the operation member 110, thereby causing the operation member 110 to rotate in a returning direction. Then, when the operation member 110 returns to its initial position, the tip portion of the cam lobe 151 is fitted into the opening 114 between the cam surfaces 113A and 113B. Therefore, the rotation of the operation member 110 in the returning direction is stopped, and the operation member 110 is held in its initial position illustrated in FIG. 11A.

Effects

As described above, a rotation detection device 100 according to one embodiment includes an operation member 110 having an annular shape and configured to be rotatable about a rotation center axis AX; a base member 120 disposed within the operation member 110; and a switch 131 configured to be pressed as the operation member 110 rotates and disposed on the base member 120 such that a rotation direction of the operation member 110 coincides with a pressing direction.

Accordingly, the rotation detection device 100 according to the embodiment can dispose the switch 131 within the operation member 110, and thus the size of the rotation detection device 100 can be reduced. Further, the rotation detection device 100 according to the embodiment can directly transmit the rotational force of the operation member 110 to the switch 131, and thus the switch 131 can be more reliably pressed.

Further, in the rotation detection device 100 according to the embodiment, the switch 131 includes a pair of switches 131A and 131B, the operation member 110 is rotatable in both directions about the rotation center axis AX, and the pair of switches 131A and 131B are configured to detect rotation of the operation member in both directions.

Accordingly, with a compact configuration, the rotation detection device 100 according to the embodiment can more reliably detect rotation operations on the operation member 110 in both directions.

Further, in the rotation detection device 100 according to the embodiment, the pair of switches 131A and 131B are disposed to face each other.

Accordingly, with a small configuration, the rotation detection device 100 according to the embodiment can more reliably detect rotation operations on the operation member 110 in both directions.

Further, in the rotation detection device 100 according to the embodiment, the operation member 110 includes a protrusion 112 disposed within the operation member 110 and between the pair of switches 131, and configured to press the pair of switches 131.

Accordingly, with a small configuration, the rotation detection device 100 according to the embodiment can more reliably detect rotation operations on the operation member 110 in the both direction.

Further, the rotation detection device 100 according to the embodiment includes a returning mechanism 100A configured to return the operation member 110 to an initial position by an elastic force.

Accordingly, the rotation detection device 100 according to the embodiment can return the operation member 110 to its initial position when a rotation operation on the operation member 110 is released. That is, the rotation detection device 100 according to the embodiment can rotate the operation member 110 from its initial position at all times.

Further, in the rotation detection device 100 according to the embodiment, the returning mechanism 100A is provided within the operation member 110, and is located opposite to the switch 131 with the rotation center axis AX interposed between the returning mechanism 100A and the switch 131.

Accordingly, the rotation detection device 100 according to the embodiment can effectively utilize a space inside the operation member 110, and thus the size of the operation member 110 can be reduced.

Further, in the rotation detection device 100 according to the embodiment, the returning mechanism 100A includes a cam member 150 disposed within the operation member 110 and having a cam lobe 151 axially oriented along the rotation center axis AX; a coil spring 160 configured to preload the cam member 150 in an axial direction of the rotation center axis AX; and cam surfaces 113A and 113B disposed within the operation member 110, integrated with the operation member 110, facing the cam lobe 151 of the cam member 150, and configured to return the operation member 110 to the initial position upon the cam lobe 151 contacting the cam surface 113A or 113B.

Accordingly, the rotation detection device 100 according to the embodiment can cause the cam member 150 and the coil spring 160 for returning the operation member 110 to its initial position to be arranged along the axial direction of the rotation center axis AX, without using a conventional torsion spring or the like. Thus, the outer diameter of the rotation detection device 100 can be reduced.

Further, in the rotation detection device 100 according to the embodiment, the switch 131 is configured to provide a clicking sensation.

Accordingly, the rotation detection device 100 according to the embodiment allows the operator to tactilely recognize that the switch 131 is pressed in response to a rotation operation.

Example

In the following, an example in which the rotation detection device 100 according to the embodiment is attached to a stylus pen 10 will be described with reference to FIG. 12 through FIG. 14.

Figure 12:
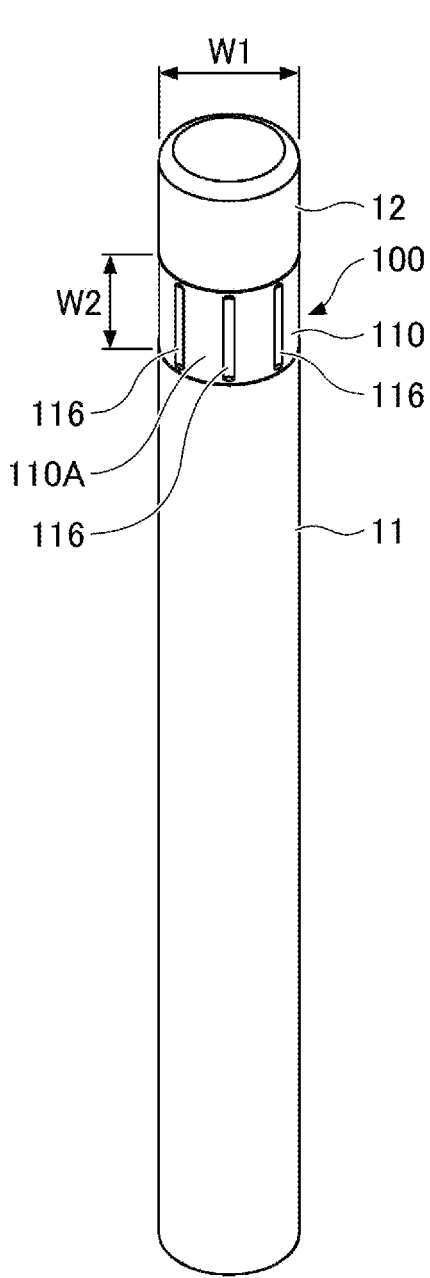
FIG. 12 is a perspective view of the exterior of a stylus pen according to an embodiment.
Figure 12:
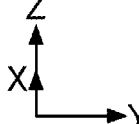

FIG. 12 is a perspective view of the exterior of the stylus pen 10 according to an embodiment. As illustrated in FIG. 12, the stylus pen 10 has a cylindrical shape as a whole, with the longer side being in the up-down direction (Z-axis direction). The stylus pen 10 includes a body 11, a cap 12, and the rotation detection device 100. In the stylus pen 10, the rotation detection device 100 is provided between the body 11 and the cap 12. The stylus pen 10 can switch between functions by a rotation operation of the rotation detection device 100. The rotation detection device 100 according to the embodiment can be installed on an end portion (upper end portion) of the body 11 of the stylus pen 10.

Further, as illustrated in FIG. 12, an outer diameter W1 of the operation member 110 included in the rotation detection device 100 is substantially equal to the outer diameter of the body 11 of the stylus pen 10. The term "substantially equal" includes a case of being the same, being slightly larger, and being slightly smaller. As an example, the outer diameter W1 of the operation member 110 is 10 millimeters (mm), and a width W2 of the operation member 110 in the upper-lower direction is 8 mm. That is, the rotation detection device 100 can be reduced in size by having the configuration described in the embodiment, and can be installed in the stylus pen 10 having a relatively small width, without any discomfort.

Further, as illustrated in FIG. 12, a plurality of grooves 116 each extending linearly in the up-down direction are formed on an outer surface 110A of the operation member 110 at regular intervals. The grooves 116 are an example of "antislip treatment". Accordingly, in the rotation detection device 100 according to the embodiment, slipping is less likely to occur on the outer surface 110A of the operation member 110, and a rotation operation on the operation member 110 can be performed more reliably. The "antislip treatment" is not limited to the grooves, and may be a plurality of projections, surface roughness treatment, or any other publicly-known treatment. Further, the outer surface 110A of the operation member 110 is not necessarily subjected to "antislip treatment".

Figure 13:
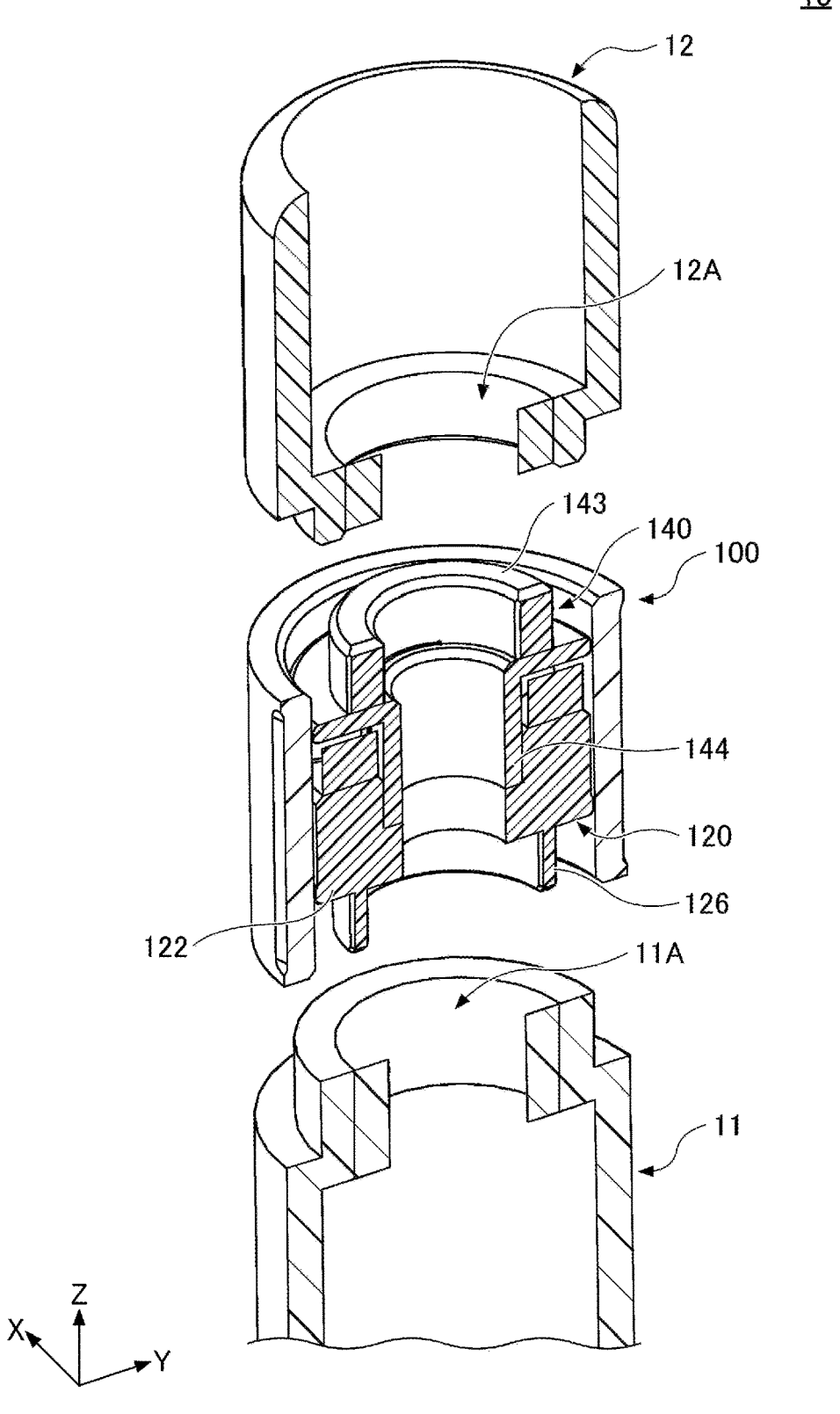
FIG. 13 is an exploded cross-sectional view of the stylus pen according to the embodiment.

FIG. 13 is an exploded cross-sectional view of the stylus pen 10 according to the embodiment. As illustrated in FIG. 13, the body 11 and the cap 12 of the stylus pen 10 both have a hollow structure, that is, a circular tubular shape.

As illustrated in FIG. 13, the rotation detection device 100 includes the semi-cylindrical protrusion 143 on the upper surface of the upper cover 140. A semicircular opening 12A is formed in the lower end of the cap 12. In the rotation detection device 100 according to the embodiment, by fitting the protrusion 143 of the upper cover 140 into the opening 12A of the cap 12 when the cap 12 is attached to the rotation detection device 100, the positioning of the cap 12 with respect to the rotation detection device 100 (center positioning and positioning in the direction of rotation) can be easily and reliably performed.

Further, as illustrated in FIG. 13, the rotation detection device 100 includes the semi-cylindrical protrusion 126 on the lower surface of the bottom plate portion 122 of the base member 120. A semicircular opening 11A is formed in the upper end of the body 11. In the rotation detection device 100 according to the embodiment, by fitting the protrusion 126 of the base member 120 into the opening 11A of the body 11 when the rotation detection device 100 is attached to the body 11, the positioning of the rotation detection device 100 with respect to the body 11 (center positioning and positioning in the direction of rotation) can be easily and reliably performed.

Figure 14:
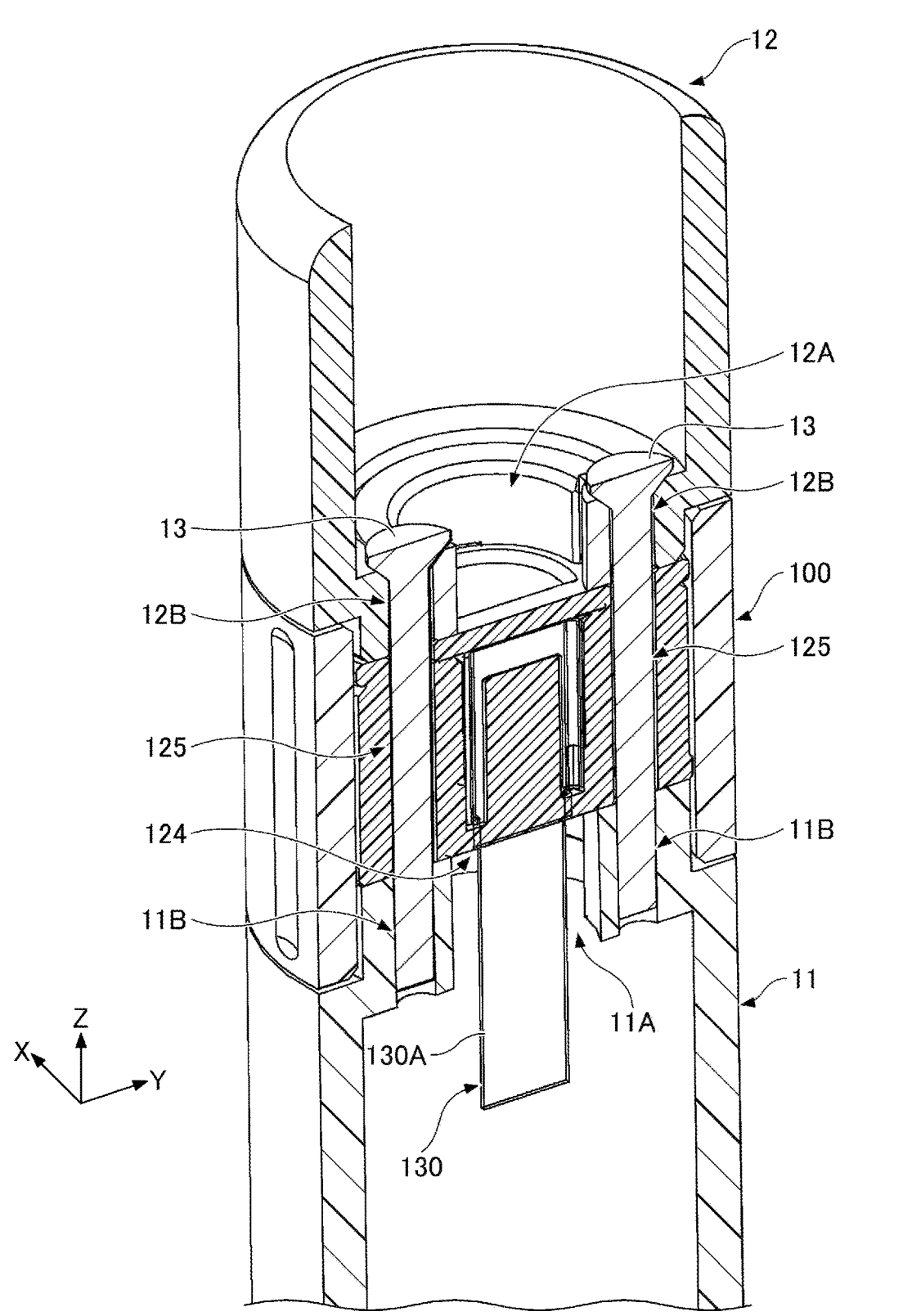
FIG. 14 is a cross-sectional of the stylus pen according to the embodiment.

FIG. 14 is a cross-sectional view of the stylus pen 10 according to the embodiment. The base portion 130A of the FPC 130 passes through the through-hole 124, formed in the bottom plate portion 122 of the base member 120, to extend to the lower side of the rotation detection device 100. Therefore, as illustrated in FIG. 14, the base portion 130A of the FPC 130 can be easily inserted into the interior of the body 11 through the opening 11A of the body 11.

Further, as illustrated in FIG. 14, the stylus pen 10 according to the embodiment includes a pair of fixing screws 13. The fixing screws 13 pass through through-holes 12B formed in lower end portions of the cap 12, pass through the through-holes 125 formed in the base member 120 of the rotation detection device 100, and are screwed into screw holes 11B formed in upper end portions of the body 11. Therefore, the rotation detection device 100 and the cap 12 can be easily coupled to the body 11.

Although specific embodiments have been described above, the present invention is not limited to these embodiments. Variations and modifications may be made without departing from the scope of the present invention as set forth in the accompanying claims.

Modification

Figure 15:
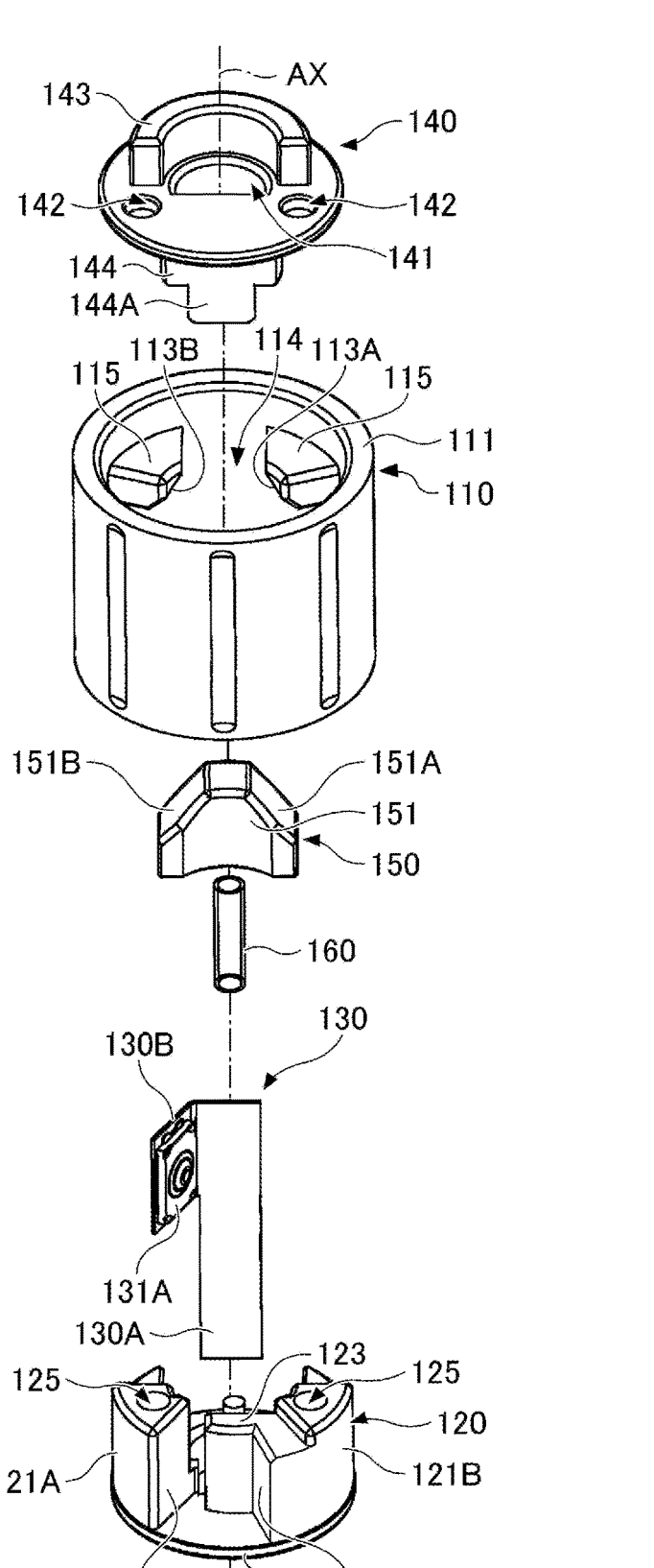
FIG. 15 is an exploded perspective view of a rotation detection device according to a modification of the embodiment.
Figure 15:
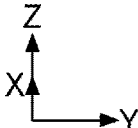
Figure 16:
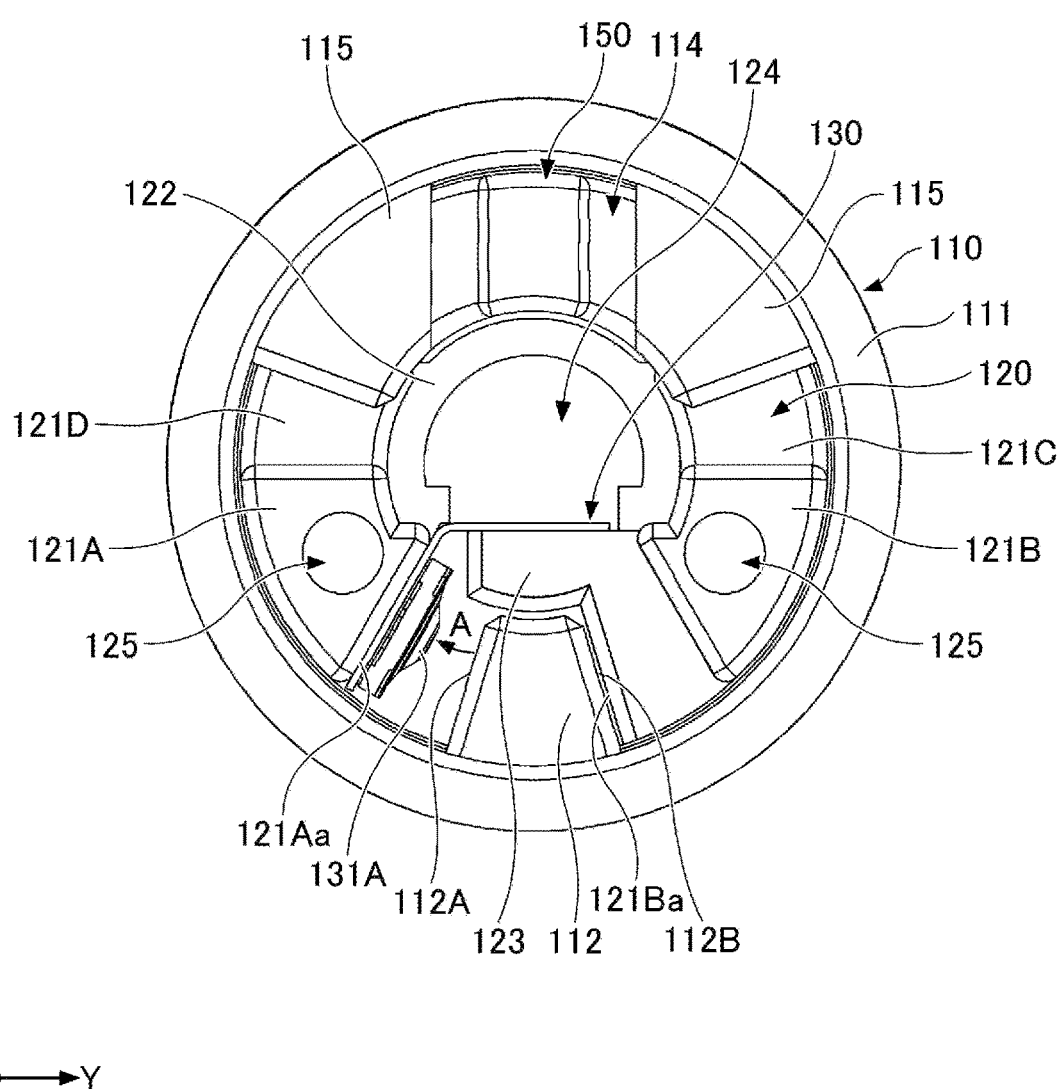
FIG. 16 is a plan view of the rotation detection device (from which the upper cover is removed) according to the modification of the embodiment, as viewed from above.
Figure 17:
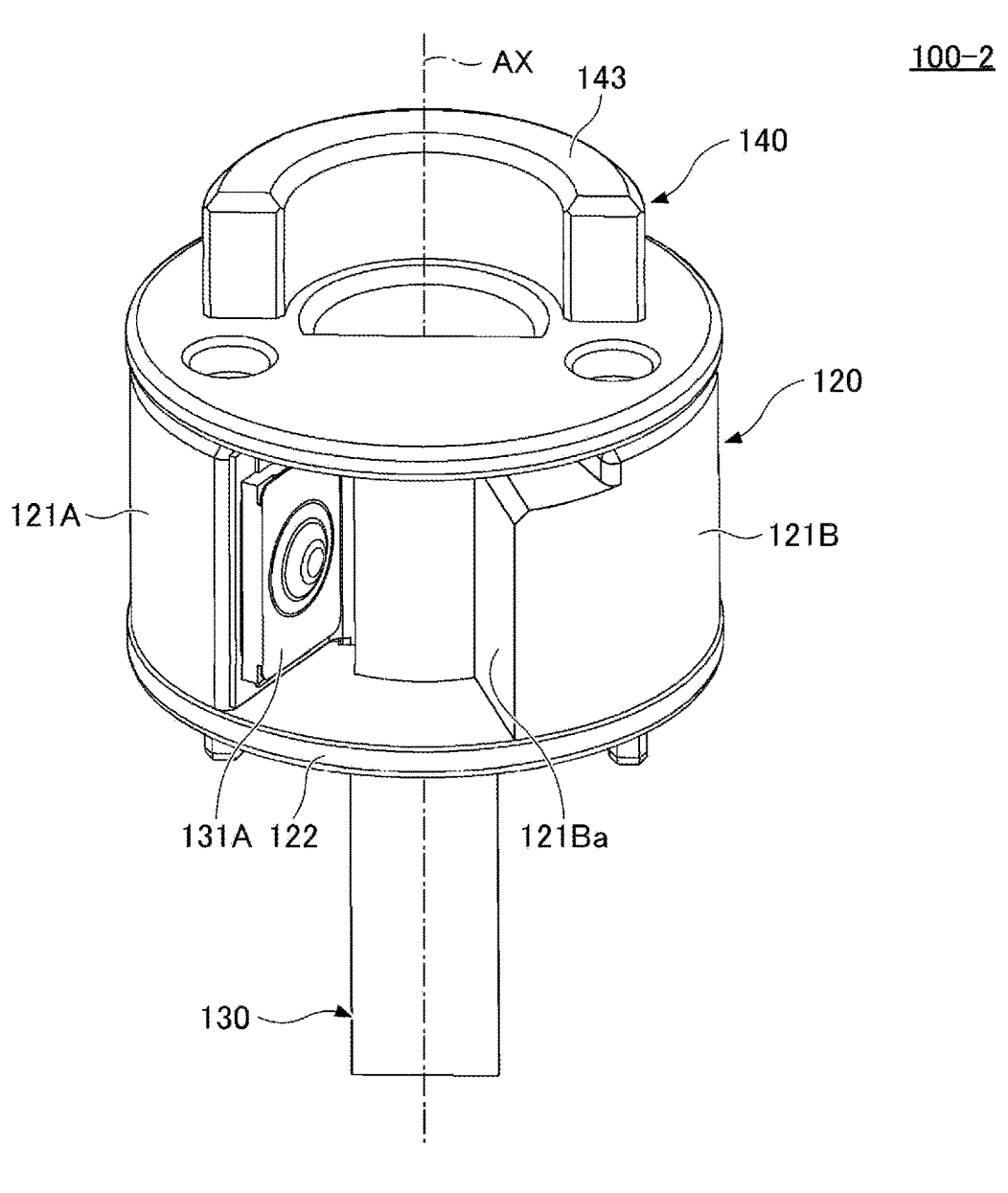
FIG. 17 is a perspective view of the exterior of the rotation detection device (from which the operation member is removed) according to the modification of the embodiment.
Figure 18:
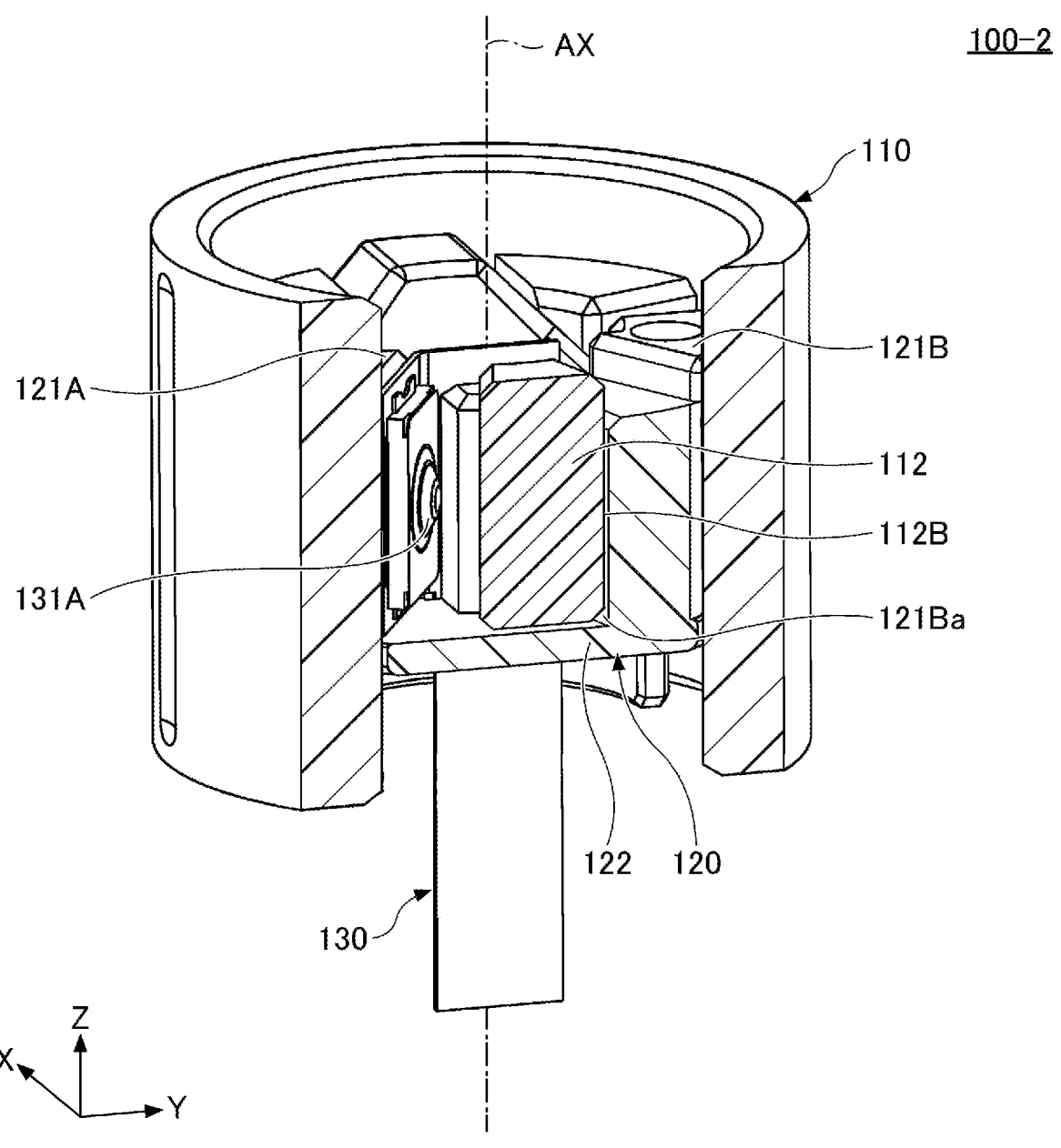
FIG. 18 is a cross-sectional view of the rotation detection device according to the modification of the embodiment.

In the following, a modification of the rotation detection device 100 according to the embodiment will be described with reference to FIG. 15 through FIG. 18. FIG. 15 is an exploded perspective view of a rotation detection device 100-2 according to a modification of the embodiment. FIG. 16 is a plan view of the rotation detection device 100-2 (from which the upper cover 140 is removed) according to the modification of the embodiment, as viewed from above. FIG. 17 is a perspective view of the exterior of the rotation detection device 100-2 (from which the operation member 110 is removed) according to the modification of the embodiment. FIG. 18 is a cross-sectional view of the rotation detection device 100-2 according to the modification of the embodiment.

The rotation detection device 100-2 illustrated in FIG. 15 through FIG. 18 is the modification of the rotation detection device 100. The rotation detection device 100-2 differs from the rotation detection device 100, in that the rotation detection device 100-2 is rotatable about one direction (a clockwise direction indicated by an arrow A) and includes one switch 131A configured to detect rotation of the operation member 110 in the one direction.

That is, the rotation detection device 100-2 does not includes any switch 131B, and a placement surface 121Ba of a pillar portion 121B protrudes to a position where the placement surface 121Ba contacts the pressing surface 112B of the protrusion 112 when the protrusion 112 is in its initial position. Accordingly, the rotation detection device 100-2 is configured such that the operation member 110 does not rotate in the other direction (counterclockwise direction) about the rotation center axis AX.

Conversely, the operation when the operation member 110 rotates in the one direction (clockwise direction) about the rotation center axis AX and the operation of returning the operation member 110 to its initial position are the same for both the rotation detection device 100-2 and the rotation detection device 100. That is, when the operation member 110 rotates in the one direction (clockwise direction), the switch 131A is pressed by the pressing surface 112A of the protrusion 112, and as a result, the rotation detection device 100-2 can detect the rotation of the operation member 110 in the one direction (clockwise direction).

According to an embodiment, a switch can be more reliably pressed while reducing the size of a rotation detection device.

What is claimed is:

1. A rotation detection device comprising:
an operation member having an annular shape and configured to be rotatable about a rotation center axis;
a base member disposed within the operation member;
a switch configured to be pressed as the operation member rotates and disposed on the base member such that a rotation direction of the operation member coincides with a pressing direction; and
a returning mechanism configured to return the operation member to an initial position by an elastic force,
wherein the returning mechanism is provided within the operation member, and is located opposite to the switch with the rotation center axis interposed between the returning mechanism and the switch,
wherein the switch includes a pair of switches,
the operation member is rotatable in both directions about the rotation center axis, and
the pair of switches are configured to detect rotation of the operation member in both directions.

2. The rotation detection device according to claim 1, wherein the pair of switches are disposed to face each other.

3. The rotation detection device according to claim 2, wherein the operation member includes a protrusion disposed within the operation member and between the pair of switches, and configured to press the pair of switches.

4. The rotation detection device according to claim 1, wherein the operation member is rotatable in one direction about the rotation center axis, and
the switch is configured to detect rotation of the operation member in the one direction.

5. The rotation detection device according to claim 1, wherein the switch is configured to provide a clicking sensation.

6. The rotation detection device according to claim 1, wherein the rotation detection device is installable on an end portion of a body of a stylus pen.

7. The rotation detection device according to claim 6, wherein an outer diameter of the operation member is substantially equal to an outer diameter of the body of the stylus pen.

8. The rotation detection device according to claim 1, wherein an outer surface of the operation member is subjected to antislip treatment.

9. A stylus pen comprising:
a body; and
the rotation detection device of claim 1 installed on an end portion of the body.

10. A rotation detection device comprising:
an operation member having an annular shape and configured to be rotatable about a rotation center axis;
a base member disposed within the operation member;
a switch configured to be pressed as the operation member rotates and disposed on the base member such that a rotation direction of the operation member coincides with a pressing direction; and
a returning mechanism configured to return the operation member to an initial position by an elastic force,
wherein the returning mechanism is provided within the operation member, and is located opposite to the switch with the rotation center axis interposed between the returning mechanism and the switch, wherein the returning mechanism includes
a cam member disposed within the operation member and having a cam lobe axially oriented along the rotation center axis,
an elastic member configured to preload the cam member in an axial direction of the rotation center axis, and
a contact portion disposed within the operation member, integrated with the operation member, facing the cam lobe of the cam member, and configured to return the operation member to the initial position upon the cam lobe contacting the contact portion.

* * * * *